United States Patent
Engström et al.

(10) Patent No.: US 6,879,969 B2
(45) Date of Patent: Apr. 12, 2005

(54) SYSTEM AND METHOD FOR REAL-TIME RECOGNITION OF DRIVING PATTERNS

(75) Inventors: Johan Engström, Göteborg (SE); Trent Victor, Linköping (SE)

(73) Assignee: Volvo Technological Development Corporation, Göteborg (SE)

(*) Notice: Subject to any disclaimer, the term of this patent is extended or adjusted under 35 U.S.C. 154(b) by 10 days.

(21) Appl. No.: 09/683,571

(22) Filed: Jan. 19, 2002

(65) Prior Publication Data

US 2002/0128751 A1 Sep. 12, 2002

Related U.S. Application Data

(60) Provisional application No. 60/262,853, filed on Jan. 21, 2001.

(51) Int. Cl.[7] .............................................. G06F 15/00
(52) U.S. Cl. ......................................... 706/20; 706/12
(58) Field of Search ..................................... 706/15–44

(56) References Cited

U.S. PATENT DOCUMENTS

| | | | | | |
|---|---|---|---|---|---|
| 4,430,656 A | * | 2/1984 | Yamada et al. | ............... | 347/76 |
| 5,089,963 A | * | 2/1992 | Takahashi | ..................... | 706/23 |
| 5,430,656 A | * | 7/1995 | Dekel et al. | ................ | 701/213 |
| 5,486,998 A | * | 1/1996 | Corso | .......................... | 700/32 |
| 5,668,717 A | * | 9/1997 | Spall | .......................... | 700/51 |
| 5,764,139 A | * | 6/1998 | Nojima et al. | ............. | 340/461 |
| 5,801,943 A | * | 9/1998 | Nasburg | ..................... | 701/117 |
| 5,983,161 A | * | 11/1999 | Lemelson et al. | .......... | 701/301 |
| 6,091,334 A | | 7/2000 | Galiana et al. | ............ | 340/576 |
| 6,154,559 A | | 11/2000 | Beardsley | .................. | 382/103 |
| 6,188,315 B1 | * | 2/2001 | Herbert et al. | .............. | 340/438 |
| 6,405,122 B1 | * | 6/2002 | Yamaguchi | ................. | 701/106 |
| 6,415,273 B1 | * | 7/2002 | Fujime | ........................ | 706/16 |
| 2001/0028309 A1 | | 10/2001 | Torch | ......................... | 340/575 |
| 2002/0120374 A1 | * | 8/2002 | Douros et al. | ................ | 701/29 |

FOREIGN PATENT DOCUMENTS

| SE | 515699 C2 | * | 9/2001 |
| WO | WO 9517686 A1 | | 6/1995 |
| WO | WO 9921145 A1 | * | 4/1999 |
| WO | WO 9926423 A2 | * | 5/1999 |
| WO | WO 9517686 A1 | * | 6/1999 |

OTHER PUBLICATIONS

Bellet T., Bruyas MP., Tattegrain–Veste H., Forzy JF., Simoes A., Carvalhais J., Lockwood P., Boudy J., Baligand B., Damiani S., and Opitz M.; "Real–Time" Analysis of the Driving Situation in Order to Manage On–Board Information, pp. 1–8; French National Institute For Transport Safety Research (INRETS).

* cited by examiner

Primary Examiner—Anthony Knight
Assistant Examiner—Michael B. Holmes
(74) Attorney, Agent, or Firm—Novak Druce & Quigg, LLP

(57) ABSTRACT

System and method for real-time, automatic, recognition of large time-scale driving patterns employs a statistical pattern recognition framework, implemented by means of feed-forward neural network utilizing models developed for recognizing, for example, four classes of driving environments, namely highway, main road, suburban traffic and city traffic, from vehicle performance data. A vehicle control application effects changes in vehicle performance aspects based on the recognized driving environment.

48 Claims, 5 Drawing Sheets

| CATEGORY | DESCRIPTION |
|---|---|
| HIGHWAY | ROAD WITH SEPARATE LANES, DIVIDED HIGHWAY - SPEED LIMIT 65 MPH (≈110 KM/H). |
| MAIN ROAD | MAIN ROAD - SPEED LIMIT 45 - 55 MPH (≈ 70 - 90 KM/H). |
| SUBURBIA | SMALL/MEDIUM ROADS IN TOWNS, VILLAGES AND SUBURBAN/PERIPHERAL CITY AREAS - SPEED LIMITS 20 - 30 MPH (≈ 30 - 50 KM/H). |
| CITY | DOWNTOWN OR CITY CENTERS WITH HIGH TRAFFIC DENSITY AND FREQUENT TRAFFIC LIGHTS - SPEED LIMIT 20-50 MPH (≈ 30 - 50 KM/H). |

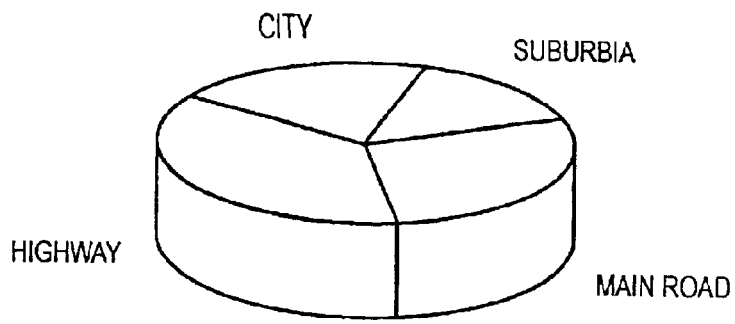

FIG. 3

| MEASURED CHARACTERISTIC | DERIVED STATISTICAL CHARACTERISTICS | |
|---|---|---|
| ACCELERATION PEDAL POSITION | AVERAGE | 40 |
| | AVERAGE DIFFERENCE | 42 |
| GEAR | AVERAGE | 44 |
| TURN INDICATOR ACTIVITY | AVERAGE | 46 |
| VEHICLE SPEED | AVERAGE | 48 |
| | STANDARD DEVIATION | 50 |
| | AVERAGE DIFFERENCE | 52 |
| STEERING ANGLE (ABSOLUTE VALUE) | AVERAGE | 54 |
| | STANDARD DEVIATION | 56 |
| ENGINE SPEED | AVERAGE | 58 |
| | STANDARD DEVIATION | 60 |
| BRAKE | AVERAGE | 62 |

(row labels 20, 22, 24, 26, 28, 30, 32)

FIG. 4

| TARGET CLASSIFICATION | MODEL CLASSIFICATION | | | |
|---|---|---|---|---|
| | HIGH-WAY | MAIN ROAD | SUBURBIA | CITY |
| HIGHWAY | 33.5 | 3.7 | 0 | 0 |
| MAIN ROAD | 1.1 | 25.5 | 0 | 0 |
| SUBURBIA | 0 | 2.0 | 12.9 | 0 |
| CITY | 0 | 0 | 2.7 | 18.7 |

*FIG. 9*

SYSTEM AND METHOD FOR REAL-TIME RECOGNITION OF DRIVING PATTERNS

CROSS REFERENCE TO RELATED APPLICATIONS

The present application claims the benefit of U.S. Provisional Application No. 60/262,853 filed 21 Jan. 2001.

BACKGROUND OF INVENTION

1. Field of the Invention

The present invention relates generally to the field of vehicles, and more particularly to a system and method for real-time recognition of large-scale vehicle driving patterns.

2. Background of the Invention

The performance of a vehicle and its systems is often strongly dependent on the current driving context. This is also true for certain vehicle control systems such as those for the engine and chassis that perform differently under varying driving conditions. Driver-vehicle interaction systems, often referred to as intelligent driver support systems, are also affected by current driving conditions and are most effective when certain key conditions are assessed and considered in their operation. Thus, if certain driving patterns associated with a particular driving situation could be detected, parameters of these dependent systems could be optimized, preferably on a real time basis. These possibilities have attracted substantial interest that has been fuelled by the rapid development of sensors capable of measuring relevant vehicle performance characteristics, as well as key driver behaviors or activities.

There are many different types of driving patterns that can be relevant to particular vehicle system performance. In this regard, a general distinction is made herein between large time-scale and small time-scale driving patterns. The latter category includes specific events or maneuvers as overtaking or passing, turning, and changing lanes. Pioneering work in this area focused on recognizing and predicting driving practices or maneuvers. By contrast, large timedriving patterns refer to more general driver characteristics and driving conditions. Examples of such driver characteristics include those related to the driver's mental state such as being drowsy, distracted, impaired because of health reasons or being under the influence of chemical substances, or attentive and focused on the driving task. Examples of relevant driving conditions or environments is city driving, highway driving and suburban driving.

Existing approaches to the detection of largepatterns associated with the driving road type/environment are problematic. One way to obtain knowledge of such largedriving contexts is by means of a global positioning system ("GPS") coupled with a map database where the geographical positions are tagged according to the desired scheme. While this approach has certain advantages, in particular its possibilities for predictive capacities, a major drawback of the scheme is the costly and laborneed for manual tagging and maintenance of the database at varying levels of detail. Moreover, since the knowledge is not based on real-time empirical data, accuracy can be limited for such reasons as variations in traffic density.

An alternative approach is to infer the current driving context directly from patterns of data obtained from vehicle sensors. Exemplary sensors are those for speed, gear-shift position, turn indicator activity, steering wheel angle, and braking activity. For example, it may be expected that driving in a city is characterized by low travel speeds having high variability and frequent brake use. Perhaps the simplest such approach is to construct a set of rules, for example "if vehicle speed is greater than 90 kilometers per hour, the current driving context is 'highway'." A basic limitation of this approach, however, is the difficulty in formulating, ad-hoc, such exact definitions of the target categories. An approach to this problem has been to use fuzzy logic in which the target categories are treated as fuzzy sets where membership is a matter of degree, rather than exact definitions.

In view of the deficiencies associated with these known approaches for assessing driving conditions, there is still a need for more useful systems and methods for performing real-time recognition of large scale driving patterns. More particularly, the present invention(s) looks to statistical pattern recognition frameworks that utilize models that learn the desired classification scheme from empirical data and recognize predefined categories of large time-scale driving patterns.

SUMMARY OF INVENTION

As intimated above, the present invention(s) utilize programs or schemes that continually adapt to, and learn from existing driving conditions. This is particularly effective because assessments are made on a real-time basis. That is to say, present conditions are assessed and analyzed in comparison to both long-term histories which have a smoothing effect, as well as short term conditions which tend to fine tune the real-time and short-term predictive accuracy. In this way, not only presently existing conditions are sensed, assessed and acted upon; but further, immediately upcoming conditions are accurately predicted and acted upon where certain vehicle operating systems are concerned.

In another aspect, the "training" of the system may be performed offline; that is, certain predetermined patterns may be utilized to assess operating and environmental characteristics rather than data that is continually updated on a real-time basis.

In this regard, it is a feature and advantage of at least one embodiment of the present invention(s) to provide a system and method for real-time recognition of large scale driving patterns that offer a theoretically sound framework for implementing optimal classification with respect to empirical data.

It is another feature and advantage of the present invention(s) to provide for real-time recognition of large scale driving patterns that enables interpreting model outputs in terms of probabilities having many useful applications, such as use of probability thresholds to determine when the model classification should be trusted. Similarly, the output probabilities can be combined with the output probabilities from other statistical models or can be used as inputs to higher-level inference systems, such as Bayesian networks.

It is a further feature and advantage of the present invention(s) to provide a system and method for real-time recognition of large scale driving patterns a model that bypasses the ad-hoc hand-crafting of inference rules that are to some extent arbitrary and that can rapidly become infeasible as the number of input features increases.

It is yet another feature and advantage of the present invention to provide a method and system for real-time recognition of large scale driving patterns a model in which the classification is performed on a real-time basis, and that is able to take account of unpredicted events such as changes in traffic density, traffic jams, and differences between individual drivers.

It is an additional feature and advantage of the present invention to provide a system and method for real-time recognition of large scale driving patterns that enables real-time optimization of engine/chassis parameters to the driving environment, for example, to reduce fuel consumption. The system and method also affords possibilities for recognizing the current driving context and enables opportunities for tailoring support given to the driver depending on his or her current needs through driver support and warning systems.

A particularly advantageous aspect of the invention(s) is to provide a system and method for real-time recognition of large scale driving patterns that applies to many types of large time-scale driving pattern recognition tasks, such as drowsy driver detection, driver distraction detection and recognition of different driving styles.

To achieve the stated and other features, advantages and objects, the present invention(s) provide systems and methods for real-time recognition of large scale driving patterns utilizing various computer hardware and software that enables, for example, optimizing driver-vehicle performance. The system and method of the invention involves, for example, collecting, on a substantially real-time basis via a plurality of sensing devices, a number of driver and vehicle performance characteristic measurements. The measurements are evaluated using feature extraction preprocessing and a neural network classifier running, for example, on a computing device coupled to the sensing devices via a controller area network bus and communication tool to predict or recognize a current driving environment.

Based on the evaluation, changes for potentiating vehicle performance can be effected in vehicle performance aspects via a vehicle control application or workload manager. According to one embodiment of the invention, driving data in the form of non-GPS based, geographically unspecific vehicle sensor signals, such as acceleration pedal position, gear selection, turn indicator activity, vehicle speed, steering wheel angle, engine speed and brake activity are collected, which represent various target categories. In one aspect, the driving data is collected from different subjects driving different routes, and in another aspect, the driving data is annotated with the target categories by the driver during driving. In a further aspect, the driving data includes data collected from sensors for tracking one or both of eye and head movements in addition to the vehicle signals.

In at least one embodiment of the present invention(s), criteria are established for predicting or recognizing driving environments that can be differentiated, for example, between highway driving, main road driving, suburban driving and city driving. In evaluating the driver and vehicle performance characteristic measurements, consideration is given to at least acceleration pedal position, gear selection, turn indicator activity, vehicle speed, steering angle, engine speed and brake activity, and one or more of those vehicle performance characteristic measurements are selected for use in the evaluation. As either part of the feature extraction process or in the evaluation process, each of the vehicle performance characteristic measurements is averaged over a predetermined time window to obtain a measure for each vehicle performance characteristic during the predetermined time window. From this, certain features of interest are extracted via preprocessing and are classified into categories of driving contexts such as a highway driving environment, a main road driving environment, a suburban driving environment, and a city driving environment using neural network modeling.

An aspect of the evaluation process involves calculating a probability of a category of driving environment by a neural network based on the measure for each vehicle performance characteristic during the predetermined time window. Based on the evaluation, certain changes in vehicle performance aspects are effected for potentiating or enhancing performance of the vehicle. For example, based on the evaluation and recognition of a particular driving environment, one or both of the engine and chassis of the vehicle may be adapted by a vehicle control application or workload manager based on recognition of the specific driving environment. Such adaptations provide a real-time optimization of one or both of an engine parameter and a chassis parameter to the specific driving environment.

Based on the evaluation, changes for potentiating vehicle performance can be effected in vehicle performance aspects via a vehicle control application or workload manager. According to one embodiment of the invention, driving data in the form of non-GPS based, geographically unspecific vehicle sensor signals, such as acceleration pedal position, gear selection, turn indicator activity, vehicle speed, steering wheel angle, engine speed and brake activity are collected, which represent various target categories. In one aspect, the driving data is collected from different subjects driving different routes, and in another aspect, the driving data is annotated with the target categories by the driver during driving. In a further aspect, the driving data includes data collected from sensors for tracking one or both of eye and head movements in addition to the vehicle signals.

BRIEF DESCRIPTION OF DRAWINGS

FIG. 3 is a pie-chart that shows a distribution of data collected for the exemplary target categories shown in FIG. 1;

FIG. 4 is a table showing examples of selectable features useable as input to the network of one embodiment of the present invention;

FIG. 9 is a plot that illustrates a confusion matrix for model classification according to one embodiment of the present invention.

DETAILED DESCRIPTION

Referring now in detail to an exemplary embodiment of the present invention(s), of which an example is illustrated in the accompanying drawings where like numerals reference like components, a system and method for real-time recognition of large scale driving patterns is disclosed that employs a statistical pattern recognition framework. The framework embodies models that learn the desired classification scheme from empirical data instead of being strictly preprogrammed with such definitions. More specifically, according to one embodiment of the present invention, feed-forward neural networks are "trained" to recognize, for example, four categories of large time-scale driving patterns including highway 10, main road 12, suburban 14 and city driving 16 environments as exemplarily defined in the table of target categories shown in FIG. 1.

A basic concept underlying the approach present invention is the exploitation of statistical differences between the target categories with respect to the average magnitude, variability and change rate of vehicle performance data. Optimal performance of pattern classification is achieved if each new input pattern x is assigned to the target category $C_k$ with the highest probability given this pattern, that is the Bayesian posterior probability $P(C_k|x)$. Using Bayes theorem, this can be expressed as:

$$P(C_k \mid x) = \frac{p(x \mid C_k) P(C_k)}{p(x)}$$

where k=1, ..., n enumerate the n classes, $p(x|C_k)$ is the class-conditional probability distributions of the inputs, $P(C_k)$ the prior probabilities of the classes, and $p(x)$ the unconditional probability density of the input patterns.

It can be shown that the outputs of a multi-layer feedforward neural network, such as a multi-layer perception ("MLP") or a radial basis function ("RBF") network, trained on minimizing a certain error function (e.g., sum of squares or cross-entropy), approximate Bayesian posterior probabilities (given assumptions of sufficient training data, sufficient model complexity and that the training procedure has found a global minimum of the error function). Thus, such models are suitable for implementing Bayesian classification on the basis of empirical data.

Figures 1, 2:
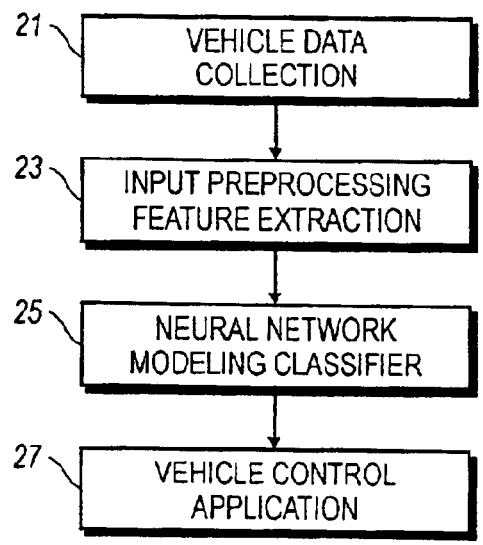
FIG. 1 is a table illustrating examples of the four target categories for an embodiment of the present invention.
FIG. 2 is a flow chart illustrating an example of the process of real-time recognition of large scale driving patterns according to an embodiment of the present invention.

FIG. 2 is a flow chart that illustrates an example of the process of real-time recognition of large scale driving patterns for an embodiment of the present invention. Referring to FIG. 2, the process includes, for example, data collection 21, input preprocessing 23, and neural network modeling 25. As an example of data collection 21, a total of 11.30 hours of driving data representing the four target categories, were collected from five different subjects driving different routes. FIG. 3 is a chart that shows a sample distribution of data collected for the target categories shown in FIG. 1. In the example, seven vehicle signals, as shown in the table of FIG. 4, were recorded, including acceleration pedal position 20, gear selection 22, turn indicator activity 24, vehicle speed 26, steering angle 28, engine speed 30 and brake activity 32. The data were obtained from a controller area network ("CAN") bus of a passenger automobile via an automotive communication tool and logged using an automotive application tool software running on a standard PC laptop computer. Each of these tools and their operation will be recognized and appreciated by those skilled in the vehicular control arts. In the example provided herein, data were recorded at 20 Hz, but later sub-sampled at 5 Hz as test runs revealed that lower sampling rates did not significantly reduce performance.

Continuing with the example, a relatively simple preprocessing methodology was employed where, for each vehicle signal, three statistical features were calculated including: (1) the average, $\mu$; (2) the standard deviation, $\sigma$; and (3) the average of the first differences, $\delta$. These features can be iteratively calculated using the following algorithm, where $x_{n+1}$ refers to the most recent data point and W is the size of the moving time window, i.e., the number of preceding samples used in the calculation.

for 2<n<W $$\mu_{n+1} = \frac{n}{n+1}\mu_n + \frac{1}{n+1}x_{n+1}$$

$$\sigma_{n+1} = \left(\frac{n-1}{n}\sigma_n^2 + \frac{1}{n}x_{n+1}^2 - \frac{n+1}{n}\mu_{n+1}^2 + \mu_n^2\right)^{1/2}$$

$$\delta_{n+1} = \frac{n+1}{n}\delta_n + \frac{1}{n}|x_{n+1} - x_n|$$

and for n>W−1

$$\mu_{n+1} = \mu_n + \frac{1}{W}(x_{n+1} - x_{n+1-W})$$

$$\sigma_{n+1} = \left(\sigma_n^2 + \frac{1}{W-1}(x_{n+1}^2 - x_{n+1-W}^2) - \frac{W}{W-1}(\mu_{n+1}^2 - \mu_n^2)\right)^{1/2}$$

$$\delta_{n+1} = \delta_n + \frac{1}{W-1}(|x_{n+1} - x_n| - |x_{n+2-W} - x_{n+1-W}|)$$

Figure 5:
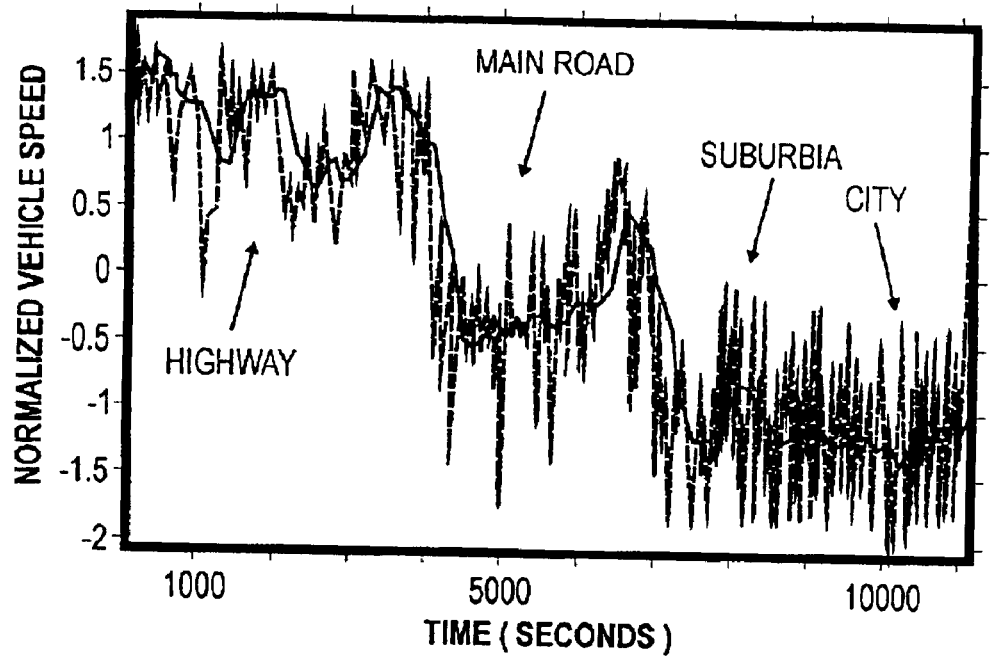
FIG. 5 is a plot that shows a moving average of a subof the vehicle speed signal with a window size of 2000 samples sampled at 5 Hz for 400 seconds which illustrates an example of the effect of the preprocessing according to one embodiment of the present invention.

From the resulting twenty-one features, twelve were selected as inputs to the model 25 on the basis of heuristic analysis of the preprocessed data. The table of FIG. 4 shows examples of selected features used as input to the network 25, including acceleration pedal position-average 40, acceleration pedal position-average difference 42, gear-average 44, turn indicator activity-average 46, vehicle speed-average 48, vehicle speed-standard deviation 50, vehicle speed-average difference 52, steering angle-average 54, steering angle-average 56, engine speed-average 58, engine speed-standard deviation 60, and brake-average 62. In order to obtain input variables of similar magnitude, the inputs were normalized by the standard deviation where, for the data to be used for testing, the parameters—mean and standard deviation—were used from the training set. FIG. 5 is a plot of the moving average of a sub-sample of the vehicle speed signal with a window size of 2000 samples (400 s) which illustrates an example of the effect of preprocessing 23 according to one embodiment of the invention.

Continuing with the same example, for neural network modeling 25, a standard multi-layer perceptron (MLP) with twelve inputs (one for each input feature), seven hidden and four output units were used. The target categories were represented by the network outputs according to a 1-of-n encoding scheme. For example, the highway category 10 is represented by {1 0 0 0}. The appropriate number of hidden units was determined empirically, and it was found that the exact number did not greatly influence model performance. The model in the example used the softmax output activation function and the output errors were calculated using the cross-entropy function. For the hidden units, the tanh activation function was used. The models were trained using back-propagation in conjunction with the scaled conjugate gradient ("SCG") parameter optimization algorithm. It should be accepted that a person having a sufficient level of skill in the present art recognizes the statistical and analytical principles presented herein, as well as the output produced using the described tools, models and means.

In the foregoing example, the models were evaluated by means of n-way cross-validation. This involves dividing the data set into n subsets and training the model on n−1 of these, while the remaining subset is used for testing. This is repeated for n times so that every subset is used for testing one run each. In order to check for over-fitting to the training set, the model was evaluated on the test set after each weights update. Each run lasted for 30 iterations of the SCG algorithm (which inherently updates the weights in batch mode), and optimum performance on test data was normally obtained within 20 iterations.

Figure 6:
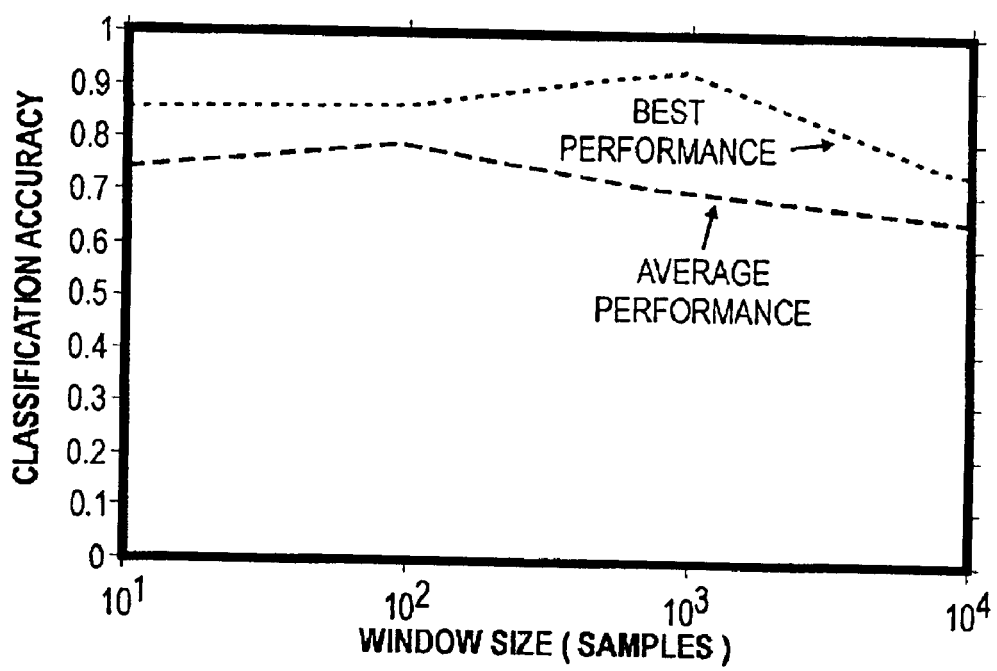
FIG. 6 is a plot illustrating average (-) and best (--) performance during cross-validation as a function of moving window size in the interval $10^1$–$10^4$ for and embodiment of the present invention.

In order to investigate the effect of moving window size, the cross-validation procedure was run for different values of this parameter. The result is shown in FIG. 6, which is a plot that illustrates average (-) and best (--) performance during cross-validation as a function of moving window size in the interval $10^1$–$10^4$. As can be appreciated from FIG. 6, the model performs well (about 95%) for a wide range of window sizes, and with slightly better performance with a window size of the order of $10^2$ $10^3$ samples (20–400 at 5 Hz). A significant difference between the best and the average performance during the cross-validation can be observed, which is probably due to the small training set and to differences in prior probabilities of the target categories in the train and test set. These issues are expanded upon and discussed further hereinbelow.

Figure 7:
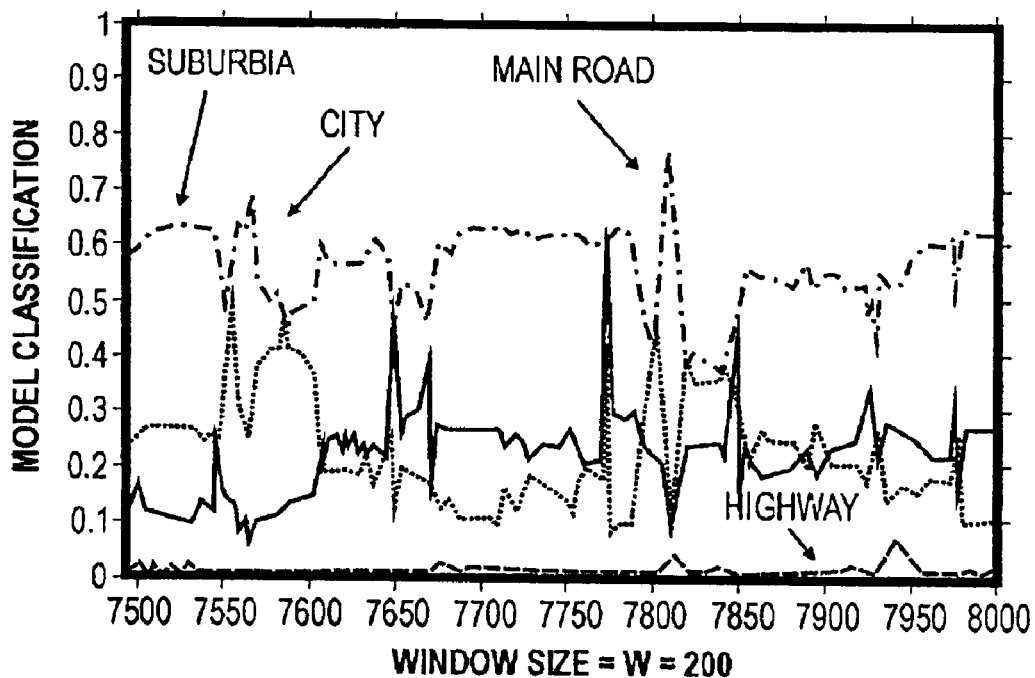
FIG. 7 is a plot that shows model outputs for an input sequence of suburban driving, preprocessed using W=200 samples (40 s) according to one embodiment of the present invention.
Figure 8:
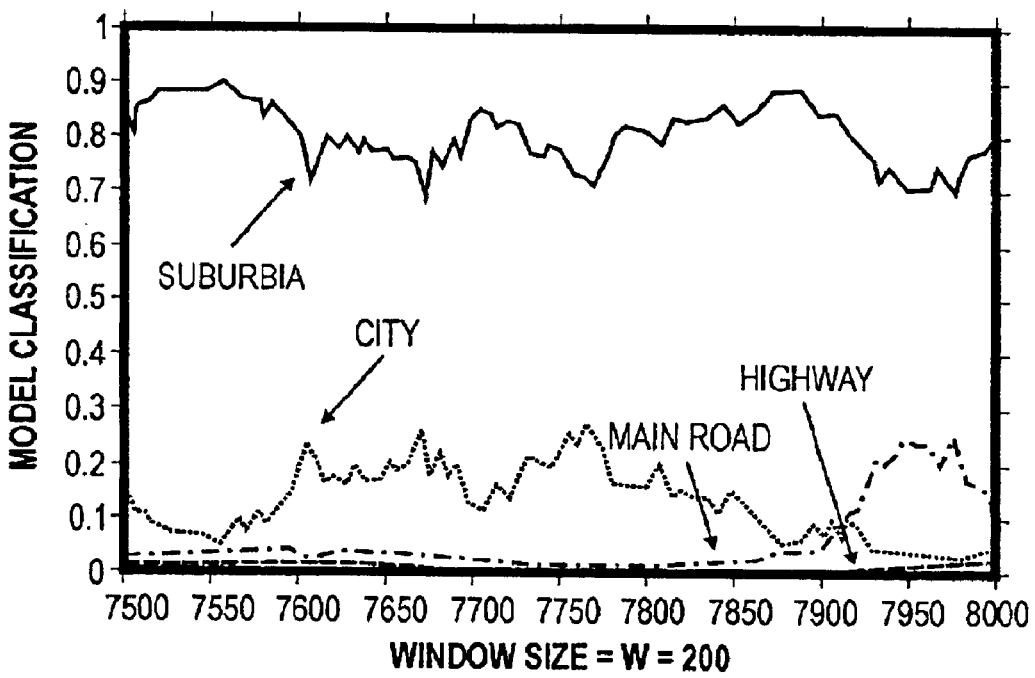
FIG. 8 is a plot that shows model outputs for an input sequence of suburban driving, preprocessed with W=2000 samples (400 s) for an embodiment of the present invention.

As shown in FIGS. 7 and 8, which illustrate model outputs for an input sequence of suburban driving 14, preprocessed with W=200 samples (40 s) in FIG. 7 and W=2000 samples (400 s) in FIG. 8, the principal importance of the window size determines the degree of stability of the classification. As is clear from FIGS. 7 and 8, for small samples W, the model is sensitive to temporary changes in the input, and it classifies some parts of the suburban driving 14 incorrectly as city 16 and main 12. This is probably the result of subsections of the suburban drive 14 having city 16 or main road 12 characteristics. Increasing window size, however, smoothes the temporary variation and yields more stable classification.

In order to more closely examine how the model classified the data, a confusion matrix was computed from the output of the model when presented to the test set. The result are shown in FIG. 9 which illustrates a confusion matrix for model classification. The figures represent percentages of the total number of samples in the test set. The overall performance on test data for this model was 90.6%. The matrix shows that the misclassifications are mainly due to confusion between related categories, for example, highway 10 and main road 12, and city 16 and suburbia 14. This was further confirmed by plotting the outputs for each input data point (as in FIGS. 7 and 8). This analysis also shows that most errors occur during the transitions between the different driving situations where large time-windows increased the number of transition errors.

The results according to the foregoing example clearly show that the model for an embodiment of the present invention is able to recognize the four target categories of driving patterns with a high degree of accuracy. The performance of the model of the present invention, ranging from about 80–95%, is dependent on several factors. First, the limited amount of data available made the model performance dependent on the composition of the training and test sets, as indicated by the differences in performance during cross-validation as is evident from FIG. 6. Accordingly, it will be appreciated that larger amounts of training data can give more accurate representations of the class-conditional distributions of the inputs and, hence, improve classification performance. It will be further appreciated that a methodology for data collection 21 in which the driver herself annotates the data with the target categories during everyday driving will allow larger quantities of driving data to be collected under more natural driving conditions.

A second related issue concerns differences in prior probabilities of the target categories $P(C_k)$ between the training and test sets. Recall that the model outputs can be interpreted as Bayesian posterior probabilities $P(C_k|x)$. Hence, a model trained on a data set consisting mainly of, for example, highway 10 data will perform sub-optimally in an operating environment dominated by main road driving 12 (due to the influence of $P(C_k)$ in Bayes theorem). This is likely an additional reason for poorer performance for some of the runs during cross-validation. This difference, however, can be compensated for without the need for re-training the model simply by dividing the outputs with the priors of the training set, multiplying them with the predicted prior probabilities of the test set/working environment and normalization so that the outputs sum to one.

This property is potentially very useful in the present context. For example, if sufficient data is available, the model can be trained on a large training set with approximately equal target priors in order to ensure that the model is sufficiently exposed to all target categories. The outputs can then be adjusted during operation based on estimations of the target priors in the current working domain. Cues of the target prior probabilities may be obtained from driving statistics, but there are also possibilities of using information from a GPS based map data-base for this purpose.

Classification performance is dependent on the size of the preprocessing time window, W, although the principal importance of this parameter is for giving stability to the classification. Large values of W increase the smoothness of the input, which makes the model more resistant to variation in the data. For example, a main road driving sequence 12 interrupted by a temporary stop at an intersection will be consistently classified as main road 12 if W is sufficiently large. However, as mentioned above, large windows also lead to slower detection of new situations, resulting in an increasing number of classification errors during transitions. Thus, there is a trade-off between classification stability and adaptivity rate during transitions, and the optimal value of W clearly depends on the type of application.

The relatively simple preprocessing technique 23 used in the presented model of the present invention is attractive for real-time applications due to its low computational cost. The computationally intensive training procedure can be done offline on separate hardware, and the only online computation required is the preprocessing 23, the forward pass through the network 25 and, optionally, post-processing of the outputs to compensate for difference in target priors. This merely involves a few addition and multiplication operations and requires only storage of the data in the time-window. An alternative for improvement of the preprocessing method 23 is to optimize the window size individually for each input feature. For more classification tasks, more sophisticated and computationally demanding methods can be used such as the extraction of features 23 in the frequency domain.

The statistical pattern recognition framework employed for an embodiment of the present invention has several important advantages in the context of large time-scale driving pattern recognition. In general, it offers a theoretically sound framework for implementing optimal classification with respect to empirical data. Moreover, the possibilities of interpreting the model outputs in terms of probabilities have many useful applications, besides those already mentioned. For example, probability thresholds can be used for determining when the model classification should be trusted. The output probabilities can also be combined with the output probabilities from other statistical models, or be used as inputs to higher-level inference systems such as Bayesian networks.

When compared to rule based approaches, such as fuzzy sets, one advantage of the model according to the present invention is that it bypasses the ad-hoc hand-crafting of inference rules, which, besides being arbitrary to some extent, quickly become infeasible as the number of input features increases. However, this comes to the price of the large amounts of representative driving data needed to train the models. As mentioned above, a cheap and easy way to obtain such data is by having drivers log and annotate the data themselves during everyday driving. In comparison to the map database approach, the model for an embodiment of the present invention has the important advantage that the classification is done in real-time and thus dependent on what is happening rather than what ought to happen according to the map. Thus this exemplary model of the present invention is able to take account of unpredicted events such as changes in traffic density, traffic jams, differences between individuals and the like without ill-effect. However, an important feature of the map database approach is the possibility to predict the driving context for the nearest future. Thus, a combination of these techniques can yield an advantageous solution as well.

An important application for the model of an embodiment of the present invention includes, for example, real-time optimization of engine/chassis parameters to the driving environment for reducing fuel consumption. Another example of an important application area is the field of driver support/warning systems, where the possibilities of recognizing the current driving context give better opportunities for tailoring the support given the user's current needs. Further, the framework for an embodiment of the present invention applies to other types of large time-scale driving pattern recognition tasks, such as drowsy driving detection, driver distraction detection and recognition of different driving styles.

A key feature of the present invention is that it can provide vehicle systems with knowledge about the driving situation, such as why the driver is driving in a particular way at the moment and what the driver is presently doing. More particularly, the presently disclosed system and methods assess the demand level of the driving situation on the driver on a real-time basis. An important application of that type is filtering information in the vehicle, for example, so that incoming phone calls can be stopped when the driver is in a particularly demanding situation. Another application of an embodiment of the present invention, for example, is adaptation of the vehicle chassis. Given different driving situations, such as passing a vehicle in a city or on a country road, the way that the vehicle itself behaves can be adapted, for example, in regard to how prepared it is for different types of crashes. In that application, adaptations can be made, for example, to accommodate a particular ride and/or particular handling characteristics. For example, the suspension can be made "softer" for highway driving 10 and adapted to city driving 16 by tightening the suspension. A further utilization of the presently disclosed invention(s) is drowsiness adaptation, such as reducing false alarms based on an assumption that drivers do not fall asleep as easily when they are very busy or otherwise receiving rapidly changing external stimulus such as in the city. Thus, the driver does not need a drowsiness warning in the city, so the drowsiness alert system turns itself on, for example, only in less stimulating environments such as highway and suburban driving.

A general application for an embodiment of the present invention is to adapt a vehicle to different types of driving situations for which there are numerous specific applications. For example, a specific application is distraction, such as recognizing how much drivers are looking at their mobile phones. Knowledge of the driving context is important so that drivers can know whether or not particular behavior is unsafe. Thus, a driver can be allowed more glances at, and more use of, a mobile phone while in a non-demanding driving situation compared to a highly demanding driving situation. A specific application of the present invention for trucks involves, for example, the use of engine brakes versus trailer brakes. The brake system that is used to halt a traveling truck is typically, at least partly dependent upon the existing driving condition(s) or environment when braking activity is required. For example, sometimes drivers are not allowed to use engine brakes in a city. There are many other adaptations of the invention that are possible in trucks. Other adaptations and applications include, for example, an engine adaptation system utilizing a detection algorithm and engine parameter in connection with computation of recognition of the driving situation.

An embodiment of the present invention makes use of a type of model called the neural network 25, which is used for statistical pattern recognition. A great deal of data can be fed in from different sources, such as steering activity 28, braking patterns 32, gear activity 22, and speed changes 20. An important aspect of the present invention focuses on, for example, the kind of entity that is recognized with the model. Rather than focusing exclusively on drowsiness of the driver, for example, at least one embodiment of the present invention focuses on recognizing particular driving situations, such as highway driving 10, main road driving 12, and city driving 16. The present invention provides a method for optimizing driver and vehicle performance which involves, for example, collecting on a substantially real-time basis a plurality of driver and vehicle performance characteristic measurements of predefined types. These performance characteristic measurements are then evaluated to predict a current driving environment, such as a city driving environment 16, and a change is effected in the vehicle performance aspects based on this evaluation.

A key feature of the present invention is the driving environment aspect. Use is made, for example, of a number of different vehicle parameters, such as steering angle 28 and speed 20. The vehicle parameters are basically averaged over a time window to obtain a measure of the amount of steering movements during a predetermined time window. That information is then fed into the pattern recognizer or neural network 25, which calculates the probability of a certain category of environment, such as a city environment 16 or a suburban environment 14.

Another key feature of the present invention is the use that is made of that information. Thus, based upon the calculated probability of a certain environment, one or more specific adaptations can be made to the vehicle. In one embodiment, the invention provides a type of workload manager 27, for example, that stops all incoming mobile phone calls and puts them in a buffer when the workload manager 27 recognizes a particular driving environment, such as an intersection, a roundabout, or the like, and puts the calls through only after leaving the particular driving environment. The system of the present invention can do the same thing with regard to managing all other information aspects in the vehicle as well. For example, the system of the present invention can give or withhold driver wake-up alerts, depending on the particular driving environment recognized by the workload manager 27.

An important aspect of the present invention involves a broad concept of implementation of the workload manager 27, in addition to the recognition system. The recognition system of the present invention calculates certain kinds of features and focuses on recognizing particular driving situations and identifying those driving situations with semantic tags, such as city 16 and suburbia 14. In other words, instead of focusing exclusively on general driver demand, an embodiment of the present invention focuses primarily on a vehicle control application 27, such as adapting the engine and/or chassis of a vehicle based on recognition of a specific driving environment. However, at least one embodiment of the present invention also makes use, for example, of one or more sensors for tracking eye and head movements, in addition to vehicle signals. Thus, in addition to the vehicle signals, an aspect of the present invention utilizes eye and head movements with the same type of neural network approach for calculating the specific environment in which the vehicle is traveling, and the conditions under which the driver is performing.

An embodiment of the present invention involves, for example, development and use of algorithms with a number of different applications, and in particular, with an application which is the recognition of different road environments or long term environments using a particular sensor configuration, such as vehicle signals of varying numbers and degrees of configuration complexity, although other sensors can be used as well. Certain kinds of eye and/or head movements are known to be indicative of different things. For example, a particular kind of eye and/or head movement is indicative of drowsiness, and another kind of eye and/or head movement is indicative of distraction. One embodiment of the present invention involves use of sensors to measure such eye and/or head movements of a vehicle driver, in addition to vehicle characteristics, in combination with use of the neural network 25, for the actual feature extraction 23 that precedes the pattern recognition 25. Thus, an important aspect of the present invention relates to the kind of signal processing feature extraction 23 that is performed on the raw data to enable calculation of all the features of interest. An aspect of the present invention focuses on the use of algorithms primarily in the case of vehicle signals and preprocessing feature extraction 23, with a major goal of detecting the driving environment.

An important aspect of the present invention relates to defining categories of environmental identification, as well as long and short term environmental identification. The present invention deals, for example, with large scale driving patterns or long-term environmental identification with respect to time. For large scale driving patterns, the road type is chosen as the semantic category, such as highway 10, main road 12, suburban 14 and/or city 16. There are any number of different ways in which to divide up different environments, so there are numerous possibilities for different semantic categories, as well as numerous names that can be applied to the semantic categories. The number and names of the different semantic categories can vary, but they still relate basically to environmental identification. For example, various categories of driving environments can each be further divided into any number of sub-categories.

An embodiment of the present invention focuses on identification of environmental categories, as opposed to driver demand. While at least some of the same or similar data may be used in connection with driver demand, identification of an environmental category, such as a roundabout, involves, for example, more data input and/or different data input. The present invention provides a method for assessing the data and identifying these environmental conditions. For example, the workload manager 27 of the system for an embodiment of the present invention can put mobile phone calls on hold based on a calculation by the system estimation unit of certain environmental situations, such as intersections and/or roundabouts. While at least some of the underlying data input may be similar to data used in driver demand calculations, the system for an embodiment of the present invention interprets and uses the data in different ways to recognize the driving environment instead of driver demand. Thus, vehicle signals indicative of particular driving environments are interpreted by the system for an embodiment of the present invention in terms of recognizing different kinds of environments, such as roundabouts and intersections.

The system for an embodiment of the present invention utilizes an algorithm that can be viewed as containing two major steps, the first of which is the feature extraction 23. In addition to the feature extraction 23, the algorithm also includes the neural network 25 that implements the second step, which is classification. Vehicle data is fed to the feature extraction process 23 from a CAN bus, and feature extraction is performed on the data. There are multiple vehicle data input feeds to the feature extraction process 23 and multiple outputs from the feature extraction process 23. At this level, a feature extraction 23 is normally performed on each input signal. The vehicle data represents a discrete data stream input into the feature extraction process 23 where signal processing is performed to calculate various things. The feature extraction or preprocessed patterns 23 of the actual features feed into the neural network classifier 25, which classifies these patterns into one of several categories, such as the four categories outlined in FIG. 1. In other words, the system takes the several streams of data, which become features at the neural network level 25, and integrates or distills them to one of the several environmental characteristics, such as the four environmental characteristics of FIG. 1. The system and method can also be used to predict (assess the probability of) the likelihood of specific types of negative occurrences being encountered; for instance, rear end collisions in stop-and-start traffic which in turn through system controls can configure the passenger's seats to a readied mode for whip-lash protection. Another example would be the detection of environments where head-on collisions are likely and responsively making the deployment mechanisms for front-impact air bags more sensitive for faster deployment. In still another example, proximity to intersections may be discerned and side impact protection systems placed on heightened alert. From a driver condition aspect, impaired states may be inferred from measured physical conditions. As an example, eye, eyelid, and head tracking may be employed for such purposes. Similarly, other biophysical characteristics can be easily measured and considered such as heart rate and breathing patterns. In all cases, however, an important aspect of the presently disclosed invention(s) is that it operates on an essentially real-time processing basis.

The feature extraction 23 is a unique aspect of an embodiment of the present invention, and a key characteristic of the feature extraction 23 is the manner in which the preprocessing and feature extraction 23 is performed. In one embodiment of the present invention, the approach to preprocessing and feature extraction 23 utilizes, for example, a filter, such as a low pass filter, which is characterized as calculating a moving average for a time period and obtaining an average value. Thus, a higher average value is obtained if the vehicle steering 28 is used with greater frequency than if it is not. In this context, it should be appreciated that the steering angle measurement is based on absolute values. Other features can be calculated, such as the measure of variability of, the data. A moving value of the standard deviation can be used, as can the moving value of the average rate of change during an interval, or the magnitude average. Still further, other summary statistical-type measurements can be utilized such as magnitude; e.g., central tendency—mean, median, mode; variability—e.g., variance and standard deviation; and rate of change—e.g. first difference. These features can also be varied by varying the time window from which the data to be processed is collected.

A significant aspect of the present invention focuses, for example, on use of a relatively long, rather than short, time window for the low pass filter. For example, when entering an intersection, the model for an embodiment the present invention uses a long time window of three minutes or longer for the low pass filter, instead of a short time window, for example, of ten seconds. The reason for the use of the longer time window is to identify a specific driving environment, instead of identifying what the driver is doing at a particular point in time. Thus, the present invention involves use of an average measure for a longer time period in order to recognize particular categories of driving environments. The decision as to the specific length of time is dependent on the particular kinds of categories sought to be recognized. In the case of aiming for broad categories, large time intervals are used. In the case of a roundabout environment identification, a somewhat shorter time interval can probably be used.

The use of environmental identification tags according to an embodiment of the present invention points in a different direction, for example, than use of driver demand as the guiding aspect. For example, road type can be divided up into any number of different semantic categories depending on the application, and if an objective is to control emissions in large cities in Europe, large cities in Europe can be used as a category on a larger scale time interval. On the other hand, if an objective is to block out information when the vehicle is on a roundabout or at an intersection, that is a category that can be modeled on a smaller scale time interval.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention.

What is claimed is:

1. A computer implemented method for optimizing driver-vechicle performance in a driver operated vehicle, said method comprising:
    collecting, on a substantially real-time basis, a plurality of measurements of at least one driver characteristic and at least one vehicle characteristic;
    evaluating said plurality of measurements to predict a current driving environment within which the vechicle is presently being driven; and
    wherein the measurement of the at least one driver characteristic is made by direct body scan of the driver.

2. A computer implemented method for optimizing driver-vehicle performance in a driver operated vehicle, said method comprising:
    collecting, on a substantially real-time basis, a plurality of measurements of at least one driver characteristic and at least one vehicle characteristic;
    evaluating said plurality of measurements to predict a current driving environment within which the vehicle is presently being driven; and
    wherein the measurement of the at least one vehicle performance characteristic is at least one of (i) non-GPS based and (ii) geographically unspecific.

3. A computer implemented method for optimizing driver-vehicle performance in a driver operated vehicle, said method comprising:
    collecting, on a substantially real-time basis, a plurality of measurements of at least one driver characteristic and at least one vehicle characteristic;
    evaluating said plurality of measurements to predict a current driving environment within which the vehicle is presently being driven; and
    wherein a resulting data set from the collection of the plurality of measurements of at least one driver characteristic and at least one vehicle characteristic has a capacity to be statistically segregated into a plurality of driving environment categories.

4. A computer implemented method for optimizing driver-vehicle performance in a driver operated vehicle, said method comprising:
    collecting, on a substantially real-time basis, a plurality of measurements of at least one driver characteristic and at least one vehicle characteristic;
    evaluating said plurality of measurements to predict a current driving environment within which the vehicle is presently being driven; and
    wherein the measurement of at least one vehicle characteristic comprises quantification of at least one of acceleration pedal position, gear selection, turn indicator activity, vehicle speed, steering angle, engine speed and brake activity.

5. A computer implemented method for optimizing driver-vehicle performance in a driver operated vehicle, said method comprising:
    collecting, on a substantially real-time basis, a plurality of measurements of at least one driver characteristic and at least one vehicle characteristic;
    evaluating said plurality of measurements to predict a current driving environment within which the vehicle is presently being driven; and
    utilizing as reference data, annotated data values incorporating a driver indication of driver environment existing at the time a respective annotated data value was collected thereby enabling look-up analysis of each real-time collected measurement.

6. A computer implemented method for optimizing driver-vehicle performance in a driver operated vehicle, said method comprising,
    collecting, on a substantially real-time basis, a plurality of measurements of at least one driver characteristic and at least one vehicle characteristic;
    evaluating said plurality of measurements to predict a current driving environment within which the vehicle is presently being driven; and
    wherein the at least one driver characteristic is driver eye movement.

7. A computer implemented method for optimizing driver-vehicle performance in a driver operated vehicle, said method comprising:
    collecting, on a substantially real-time basis, a plurality of measurements of at least one driver characteristic and at least one vehicle characteristic;
    evaluating said plurality of measurements to predict a current driving environment within which the vehicle is presently being driven; and wherein the at least one driver characteristic is driver head movement.

8. A computer implemented method for optimizing driver-vehicle performance in a driver operated vehicle said method comprising:

collecting, on a substantially real-time basis, a plurality of measurements of at least one driver characteristic and at least one vehicle characteristic;

evaluating said plurality of measurements to predict a current driving environment within which the vehicle is presently being driven; and utilizing predetermined criteria for predicting driving environments, the predetermined criteria differentiating between at least two of a plurality of driving environments including highway driving, main road driving, suburban driving and city driving.

9. A computer implemented method for optimizing driver-vehicle performance in a driver operated vehicle said method comprising:

collecting, on a substantially real-time basis, a plurality of measurements of at least one driver characteristic and at least one vehicle characteristic;

evaluating said plurality of measurements to predict a current driving environment within which the vehicle is resents being driven; and collecting and recording a plurality of measurements of a plurality of driver characteristics and a plurality of vehicle characteristics from a plurality of subjects thereby creating a collection of reference values for the driver and vehicle characteristics.

10. A computer implemented method for optimizing driver-vehicle performance in a driver operated vehicle, said method comprising:

collecting on a substantially real-time basis, a plurality of measurements of at least one driver characteristic and at least one vehicle characteristic;

evaluating said plurality of measurements to predict a current driving environment within which the vehicle is presently being driven; and collecting and recording a plurality of measurements of a plurality of driver characteristics and a plurality of vehicle characteristics from a plurality of subjects driving a plurality of routes thereby creating a collection of reference values for the driver and vehicle characteristics.

11. A computer implemented method for optimizing driver-vehicle performance in a driver operated vehicle, said method comprising:

collecting on a substantially real-time basis a plurality of measurements of at least one driver characteristic and at least one vehicle characteristic;

evaluating said plurality of measurements to predict a current driving environment within which the vehicle is presently being driven; and considering at least acceleration pedal position, gear selection, turn indicator activity, vehicle speed, steering angle, engine speed and brake activity in the evaluation.

12. A computer implemented method for optimizing driver-vehicle performance in a driver operated vehicle, said method comprising:

collecting, on a substantially real-time basis, a plurality of measurements of at least one driver characteristic and at least one vehicle characteristic;

evaluating said plurality of measurements to predict a current driving environment within which the vehicle is presently being driven; and considering at least one of acceleration pedal position, gear selection, turn indicator activity, vehicle speed, steering angle, engine speed and brake activity in the evaluation.

13. A computer implemented method for optimizing driver-vehicle performance in a driver operated vehicle, said method comprising:

collecting, on a substantially real-time basis, a plurality of measurements of at least one driver characteristic and at least one vehicle characteristic;

evaluating said plurality of measurements to predict a current driving environment within which the vehicle is presently being driven; and analyzing in a pre-processing step over a predetermined time window, a series of iteratively collected measurements of at least one of the plurality of measurements of at least one driver characteristic and at least one vehicle characteristic for purposes of feature extraction.

14. The method of claim 13, wherein said analysis in the preprocessing step comprises computing an average of the collected measurements of at least one of the plurality of measurements of at least one driver characteristic and at least one vehicle characteristic.

15. The method of claim 14, further comprising:

determining the probable driving environment occurring during the predetermined time window based on the computed average of the collected measurements of at least one of the plurality of measurements of at least one driver characteristic and at least one vehicle characteristic.

16. The method of claim 15, wherein said predetermined time window is sufficiently long to determine the driving environment occurring during the predetermined time window while avoiding identification of a small-time scale driving pattern.

17. The method of claim 15, wherein said predetermined time window is sufficiently short to determine a small-time scale driving pattern occurring during the predetermined time window.

18. The method of claim 17, wherein said determined small-time scale driving pattern identifies at least one of the conditions of turning the vehicle, changing lanes in the vehicle and passing another vehicle.

19. The method of claim 13, wherein said analysis in the preprocessing step comprises computing a standard deviation of the collected measurements of at least one of the plurality of measurements of at least one driver characteristic and at least one vehicle characteristic.

20. The method of claim 15, further comprising:

determining the probabilistic driving environment occurring during the predetermined time window based on the averaged value.

21. A computer implemented method for optimizing driver-vehicle performance in a driver operated vehicle, said method comprising:

collecting on a substantially real-time basis, a plurality of measurements of at least one driver characteristic and at least one vehicle characteristic;

evaluating said plurality of measurements to predict a current driving environment within which the vehicle is presently being driven; and ascertaining a probability of a particular driving environment occurring during a predetermined time window utilizing a neural network to analyze the plurality of collected measurements.

22. The method of claim 21, further comprising:
performing statistical pattern recognition utilizing the neural network.

23. The method of claim 21, wherein the ascertainable driving environments include at least one of a highway driving environment, a main road driving environment, a suburban driving environment, and a city driving environment.

24. A computer implemented method for optimizing driver-vehicle performance in a driver operated vehicle, said method comprising:
collecting, on a substantially real-time basis, a plurality of measurements of at least one driver characteristic and at least one vehicle characteristic; and
evaluating said plurality of measurements to predict a current driving environment within which the vehicle is presently being driven; and
effecting changes in performance characteristics of the vehicle based on the evaluation of the plurality of measurements of at least one driver characteristic and at least one vehicle characteristic.

25. The method of claim 24, wherein effecting the changes in vehicle performance characteristics further comprises adapting the performance of at least one of (i) an engine and (ii) a chassis of the vehicle based on recognition of a particular driving environment.

26. The method of claim 25, wherein effecting the changes in performance characteristics of the vehicle aspects further comprises effecting real-time optimization of at least one of an engine parameter and a chassis parameter to a predicted current driving environment.

27. A computer implemented method for ascertaining, on an essentially real-time basis, large time-scale driving patterns indicative of the current driving environment of an operator-driven vehicle, said method comprising:
repetitively sensing, on an essentially real-time basis, at least one of (i) a non-GPS-based, geographically unspecific vehicle characteristic and (ii) a physical characteristic of an operator of an operator-driven vehicle, and therefrom collecting a data set for statistical pattern recognition analysis;
performing statistical pattern recognition analysis on the data set;
ascertaining a large time-scale driving pattern occurring during the collection of the data set based on the analysis; and
computing statistical characteristics of the data set including at least one of the parameters average magnitude, variability and change rate of the data set.

28. A computer implemented method for ascertaining, on an essentially real-time basis, large time-scale driving patterns indicative of the current driving, environment of an operator-driven vehicle, said method comprising:
repetitively sensing, on an essentially real-time basis, at least one of (i) a non-GPS-based, geographically unspecific vehicle characteristic and (ii) a physical characteristic of an operator of an operator-driven vehicle, and therefrom collecting a data set for statistical pattern recognition analysis;
performing statistical pattern recognition analysis on the data set; and
ascertaining a large time-scale, driving pattern occurring during the collection of the data set based on the analysis; and
categorizing the ascertained large time-scale driving pattern occurring during the collection of the data set into one category, among a plurality of categories, that is representative of the driving environment occurring during the collection of the data set.

29. The method as recited in claim 28, further comprising:
defining the plurality of categories to differentiate between (i) a highway driving environment, (ii) a suburban driving environment and (iii) a city driving environment.

30. The method as recited in claim 28, further comprising:
classifying a highway driving environment as one of the plurality of possible categories of driving environment occurring during the collection of the data set.

31. The method as recited in claim 28, further comprising:
classifying a main road driving environment as one of the plurality of possible categories of driving environment occurring during the collection of the data set.

32. The method as recited in claim 28, further comprising:
classifying a suburban driving environment as one of the plurality of possible categories of driving environment occurring during the collection of the data set.

33. The method as recited in claim 28, further comprising:
classifying a city driving environment as one of the plurality of possible categories of driving environment occurring during the collection of the data set.

34. The method as recited in claim 28, further comprising:
basing the categorization on a probability calculated from the data set.

35. A computer implemented method for ascertaining, on an essentially real-time basis, large time-scale driving patterns indicative of the current driving environment of an operator-driven vehicle, said method comprising:
repetitively sensing, on an essentially real-time basis, at least one of (i) a non-GPS-based geographically unspecific vehicle characteristic and (ii) a physical characteristic of an operator of an operator-driven vehicle, and therefrom collecting a data set for statistical pattern recognition analysis;
performing statistical pattern recognition analysis on the data set;
ascertaining a large time-scale driving pattern occurring during the collection of the data set based on the analysis;
producing a data stream constituted at least in part by iterative measurements of the at least one of (i) a non-GPS-based, (ii) geographically unspecific vehicle characteristic and (iii) a physical characteristic of an operator of an operator-driven vehicle; and
selecting members of the data set based on application of a large-scale predetermined time window to the data stream.

36. The method as recited in claim 35, wherein the large-scale predetermined time window has a period of approximately 400 seconds.

37. A computer implemented method for ascertaining, on an essentially real-time basis, large time-scale driving patterns indicative of the current driving environment of an operator-driven vehicle, said method comprising:
repetitively sensing, on an essentially real-time basis, at least one of (i) a non-GPS-based, geographically unspecific vehicle characteristic and (ii) a physical characteristic of ail operator of an operator-driven vehicle and therefrom collecting a data set for statistical pattern recognition analysis;
performing statistical pattern recognition analysis on the data set;

ascertaining a large time-scale driving pattern occurring during the collection of the data set based on the analysis; and producing a data stream constituted at least in part by iterative measurements of the at least one of (i) a non-GPS-based, (ii) geographically unspecific vehicle characteristic and (iii) a physical characteristic of an operator of an operator-driven vehicle; and ascertaining a small tune-scale driving pattern occurring during the collection of the data set by analysis of a sub-set sampling therefrom based on application of a small-scale predetermined time window to the data stream.

38. The method as recited in claim 27, wherein the small-scale predetermined time window has a period of approximately 40 seconds.

39. A computer implemented method for ascertaining, on an essentially real-time basis, large time-scale driving patterns indicative of the current driving environment of an operator-driven vehicle, said method comprising:

repetitively sensing, on an essentially real-time basis, at least one of (i) a non-GPS-based, geographically unspecific vehicle characteristic and (ii) a physical characteristic of an operator of an operator-driven vehicle, and therefrom collecting a data set for statistical pattern recognition analysis;

performing statistical pattern recognition analysis on the data set;

ascertaining, a large time-scale driving pattern occurring during the collection of the data set based on the analysis; and wherein each member of the data set represents a discrete quantification of at least one vehicle characteristic selected from a group of vehicle characteristics including (i) accelerator pedal position, (ii) gear selection, (iii) turn indicator position, (iv) vehicle speed, (v) steering angle, (vi) engine speed and (vii) brake activity.

40. The method as recited in claim 39, wherein the physical characteristic of the operator is eye orientation.

41. The method of claim 40, wherein the measurement of the operator's eye orientation is made by direct body scan of the driver.

42. A computer implemented method for ascertaining, on an essentially real-time basis, large time-scale driving patterns indicative of the current driving, environment of an operator-driven vehicle, said method comprising:

repetitively sensing, on an essentially real-time basis, at least one of (i) a non-GPS-based, geographically unspecific vehicle characteristic and (ii) a physical characteristic of an operator of an operator-driven vehicle, and therefrom collecting a data set for statistical pattern recognition analysis;

performing statistical pattern recognition analysis on the data set;

ascertaining a large time-scale driving pattern occurring during the collection of the data set based on the analysis; and wherein the physical characteristic of the operator is head orientation.

43. The method of claim 42, wherein the measurement of the operator's head orientation is made by direct body scan of the driver.

44. The method as recited in claim 28, further comprising: effecting changes in vehicle performance aspects based on the ascertained large time-scale driving pattern for potentiating vehicle performance in the categorized driving environment.

45. A computer implemented method for ascertaining, on an essentially real-time basis, large time-scale driving patterns indicative of the current driving environment of an operator-driven vehicle, said method comprising:

repetitively sensing, on an essentially real-time basis, a vehicle characteristic and collecting therefrom a data set for statistical pattern recognition analysis;

performing statistical pattern recognition analysis on the data set;

ascertaining a large time-scale driving pattern occurring during the collection of the data set based on the analysis; and wherein said vehicle characteristic is at least one of (i) non-GPS-based and (ii) geographically unspecific.

46. A computer implemented method for ascertaining, on an essentially real-time basis, large time-scale driving patterns indicative of the current driving environment of an operator-driven vehicle, said method comprising:

repetitively sensing, on an essentially real-time basis, a physical characteristic of an operator of an operator-driven vehicle, and therefrom collecting a data set for statistical pattern recognition analysis;

performing statistical pattern recognition analysis on the data set;

ascertaining a large time-scale driving pattern occurring during the collection of the data set based on the analysis; and wherein said physical characteristic of the operator is head movement.

47. A computer implemented method for ascertaining, on an essentially real-time basis, large time-scale driving patterns indicative of the current driving environment of an operator-driven vehicle, said method comprising:

repetitively sensing, on an essentially real-time basis, a physical characteristic of an operator of an operator-driven vehicle, and therefrom collecting a data set for statistical pattern recognition analysis;

performing statistical pattern recognition analysis on the data set;

ascertaining a large time-scale driving pattern occurring during the collection of the data set based on the analysis; and wherein said physical characteristic of the operator is eye movement.

48. A computer implemented method for ascertaining, on an essentially real-time basis, large time-scale driving patterns indicative of the current driving environment of an operator-driven vehicle, said method comprising:

repetitively sensing, on an essentially real-time basis, a physical characteristic of an operator of an operator-driven vehicle, and therefrom collecting a data set for statistical pattern recognition analysis;

performing statistical pattern recognition analysis on the data set;

ascertaining a large time-scale driving pattern occurring during the collection of the data set based on the analysis; and determining a current driving environment from said ascertained large time-scale driving pattern.

* * * * *